US010253750B2

(12) United States Patent
Shin et al.

(10) Patent No.: US 10,253,750 B2
(45) Date of Patent: Apr. 9, 2019

(54) CONTROLLER FOR PENDULUM TYPE WAVE-POWER GENERATING APPARATUS

(71) Applicant: Korea Institute of Ocean Science & Technology, Ansan (KR)

(72) Inventors: Seung-Ho Shin, Daejeon (KR); Key-Yong Hong, Daejeon (KR); Tomiji Watabe, Hokkaido (JP)

(73) Assignee: KOREA INSTITUTE OF OCEAN SCIENCE & TECHNOLOGY, Ansan (KR)

( * ) Notice: Subject to any disclaimer, the term of this patent is extended or adjusted under 35 U.S.C. 154(b) by 205 days.

(21) Appl. No.: 15/283,814

(22) Filed: Oct. 3, 2016

(65) Prior Publication Data

US 2017/0089320 A1    Mar. 30, 2017

Related U.S. Application Data

(63) Continuation of application No. 13/512,697, filed as application No. PCT/KR2011/005269 on Jul. 18, 2011.

(30) Foreign Application Priority Data

Apr. 8, 2011    (KR) .......................... 10-2011-0032891

(51) Int. Cl.
F03B 13/18    (2006.01)
F03B 13/22    (2006.01)
(Continued)

(52) U.S. Cl.
CPC ............ *F03B 13/22* (2013.01); *F03B 13/182* (2013.01); *F03B 15/00* (2013.01); *F03B 15/02* (2013.01);
(Continued)

(58) Field of Classification Search
CPC ..................................................... F03B 13/182
See application file for complete search history.

(56) References Cited

U.S. PATENT DOCUMENTS

| 4,490,621 A | 12/1984 | Watabe et al. |
| 4,580,400 A | 4/1986 | Watabe et al. |
| 4,883,411 A | 11/1989 | Windle |

FOREIGN PATENT DOCUMENTS

| JP | 09144642 A | 6/1997 |
| KR | 19910008279 A | 5/1991 |
| KR | 1020040027662 A | 4/2004 |

OTHER PUBLICATIONS

PCT International Search Report dated Mar. 28, 2012, for related application PCT/KR2011/005269.

*Primary Examiner* — F Daniel Lopez
(74) *Attorney, Agent, or Firm* — Fredrikson & Byron, P.A.

(57) ABSTRACT

The present invention provides a controller for a pendulum type wave-power generating apparatus. Electric power produced by wave-power generation has been pointed out as being of low efficiency and more expensive than wind-power generation. To overcome the above problems, the present invention uses resonance and impedance matching of the sea waves, thus making it possible to markedly enhance the efficiency of wave-power generation. The present invention does not use a wave-height meter which is generally expensive and controls the generating apparatus in response to variation of the conditions of the sea, thus automatically maintaining the resonance and impedance matching operation, thereby making high-efficiency operation possible. As a result, the cost of the wave-power generation can be reduced, so that the wave-power generation can be widely commercialized.

4 Claims, 3 Drawing Sheets

(51) Int. Cl.
   *F03B 15/00* (2006.01)
   *F03B 15/02* (2006.01)
   *F15B 1/04* (2006.01)
   *F15B 11/16* (2006.01)
   *F15B 13/06* (2006.01)

(52) U.S. Cl.
   CPC ............... *F15B 1/04* (2013.01); *F15B 11/16* (2013.01); *F15B 13/06* (2013.01); *F05B 2220/706* (2013.01); *F05B 2260/406* (2013.01); *F15B 2211/50* (2013.01); *Y02E 10/38* (2013.01)

CONTROLLER FOR PENDULUM TYPE WAVE-POWER GENERATING APPARATUS

RELATED APPLICATIONS

This is a continuation of application Ser. No. 13/512,697, filed May 30, 2012, which is a 35 U.S.C. 371 national stage filing from International Application No. PCT/KR2011/005269 filed Jul. 18, 2011, and claims priority to Korean Application No. 10-2011-032891 filed Apr. 8, 2011, the teachings of each of which are incorporated herein by reference.

TECHNICAL FIELD

The present invention relates, in general, to controllers for pendulum type wave-power generating apparatuses. Wave-power generation is a fascinating field that uses sea waves having high energy density, but commercialization has been delayed by the difficulty of reducing the cost of power generation. Wave power is irregular wave energy, so it is difficult to handle it. Commercialization is much more difficult, compared to other fields, because of the severe environmental conditions of the sea. The biggest problem is low power generation efficiency. Solving this problem has been pointed out as the basic priority. The present invention relates, more particularly, to a controller for pendulum type wave-power generating apparatuses which controls the operation conditions of a pendulum type wave-power generating apparatus in response to the characteristics of sea waves so that high power generation efficiency can always be maintained regardless of variations in the state of the sea waves, thus reducing the cost of power generation.

BACKGROUND ART

Sea waves are composite waves that are a combination of different kinds of regular waves, but they are not completely irregular and have spectrum structures in which most energy is concentrated around regular waves of a specific height and frequency. Using such characteristics, sea waves are converted into regular waves of the same period as that of the center of the spectrum. The response of wave-power generation with respect to the regular waves of specified wave height and frequency is checked using antenna theory. A method of commercialization has been discovered that makes reference to the above behavior of the response. There is a close correspondence between wave-power generation and the antenna. The antenna theory can be used as an effective tool when researching wave-power generation.

The problem is that sea waves are not regular. The waveform of sea waves is distorted with respect to that of a sine wave. The wave height and wave length are also not constant. However, in terms of statistics, the wave nature can be obviously read from the sea waves. Further, if the mean value is paid attention to, there is regularity between the wave height and the wave period. For this reason, sea waves are regarded as semi-regular waves and as a kind of wave motion which continuously varies within a regular pattern. Therefore, with regard to wave-power generation, if parameters of a generation apparatus are adjusted (optimized) in response to variation of characteristics attributable to the irregularity of the sea waves, that is, in response to a variation in conditions, satisfactory power generation can be automatically maintained. For this, development of a controller for wave-power generating apparatuses that can reduce the cost of power generation is required.

DISCLOSURE

Technical Problem

Accordingly, the present invention has been made keeping in mind the above problems occurring in the prior art, and a first object of the present invention is to control the output volume value (the size of output volume) of a hydraulic motor in response to a variation in irregular sea waves such that the generation load is optimized, thus automatically maintaining satisfactory power generation, thereby reducing the cost of power generation.

A second object of the present invention is to cope with variation in the state of sea waves without using a separate wave height meter, in an effort to realize a reduction in the cost of power generation. The wave height meter is not only very expensive but also requires high technology to process obtained data, thus making common on-line use of it difficult. If data about irregular waves could be obtained without using a wave height meter, the practical effect of a wave-power generating apparatus would be markedly enhanced.

The above and other objects, features and advantages of the present invention will be more clearly understood from the following detailed description taken in conjunction with the accompanying drawings. Furthermore, the objects, features and advantages of the present invention can be realized by means disclosed in the accompanying claims or combination thereof.

Technical Solution

In order to accomplish the above objects, the present invention provides a controller for a pendulum type wave-power generating apparatus converting a pendulum motion of wave-power energy into a rotary motion using a hydraulic transmission that has pressure accumulators (31) and (41) on a hydraulic circuit thereof, thus operating a generator (60), the controller including: pressure control valves (33) and (43) controlling output volumes of hydraulic motors (32) and (42) that operate the generator (60) such that the output volumes are proportional to mean hydraulic pressures in pipes (30) and (40) of the hydraulic circuit so that a mean value of wave-power energy input into the hydraulic circuit is equal to a mean value of a drive force of the generator (60), whereby wave-power energy is able to be used regardless of a variation in wave conditions on the sea.

Advantageous Effects

As described above, a pendulum type wave-power generation apparatus is characterized in that it can be constructed at a comparatively low cost and the efficiency thereof is superior. For instance, in the case of a unit apparatus, estimated unit generation cost has been reported as being ≤0.085 $/kWh, so it has already reached a practicable level.

A controller for pendulum type wave-power generating apparatuses according to the present invention can further reduce unit power cost compared to the level of the conventional technique. Thus, the present invention can reliably eliminate the obstacle (the problem of the high cost of power generation) to commercializing the wave-power generation. Therefore, the present invention makes it possible to devise a detailed plan for using wave-power energy as well as measures to cope with stormy conditions, thus promoting the commercialization of wave-power generation.

Furthermore, the controller for pendulum type wave-power generating apparatuses according to the present invention has a simple and strong structure, thus ensuring the sufficient durability against conditions of the sea.

Moreover, thanks to the above-mentioned effects, use of wave-power energy for purposes of commercialization that has been at a standstill becomes possible. This also has an effect on environmental preservation.

DESCRIPTION OF THE ELEMENTS IN THE DRAWINGS

Figure 1:
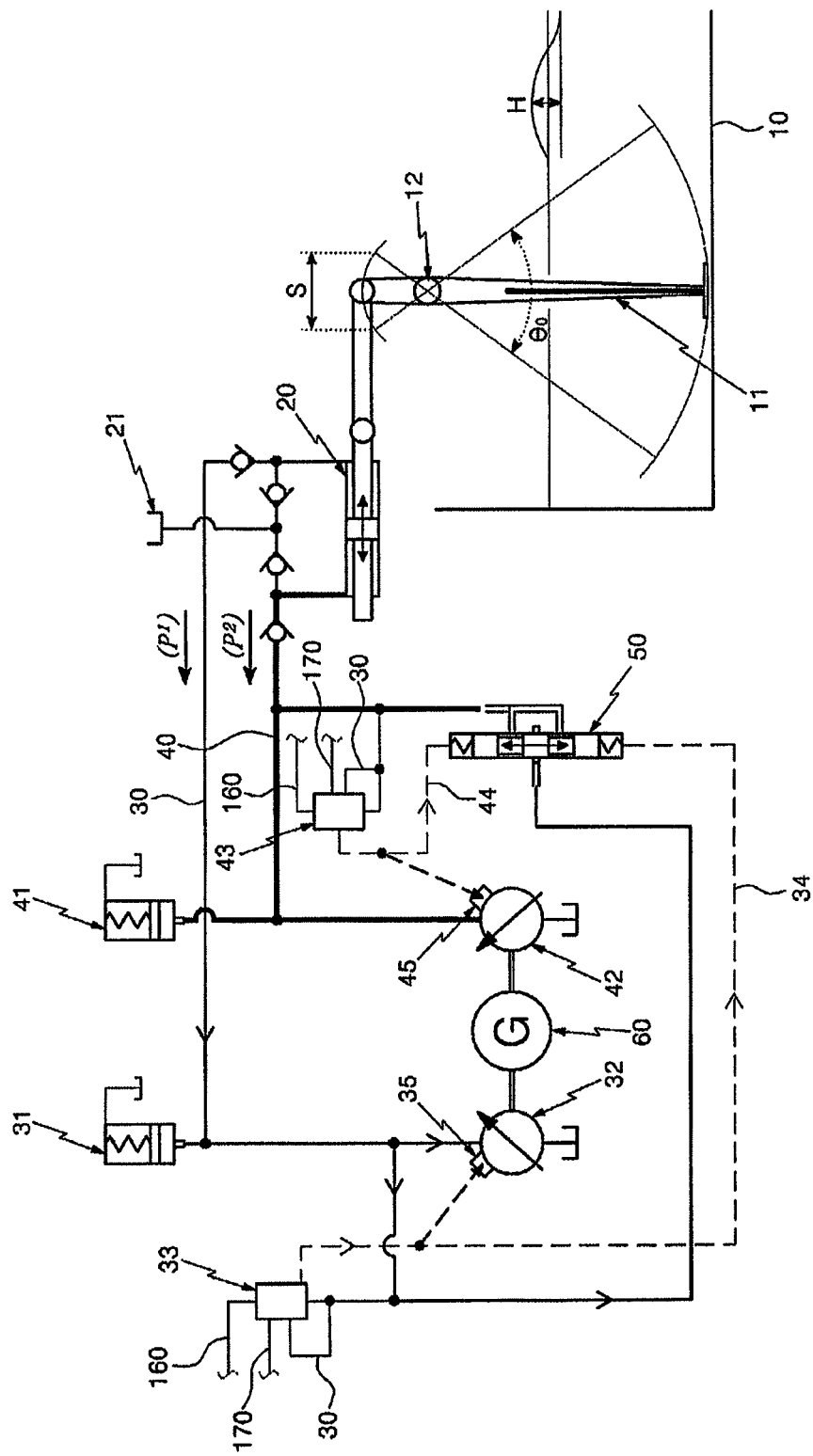
FIG. 1 is a system circuit view showing the structure of a pendulum type wave-power generating apparatus provided with a controller for pendulum type wave-power generating apparatuses according to an embodiment of the present invention to improve the power generation efficiency.

10: channel
11: pendulum
12: support point
20: hydraulic pump
21: bed tank
30, 40: pipe
31, 41: pressure accumulator
32, 42: hydraulic motor
33, 43: pressure control valve
44, 54: control signal
50: switching valve
60: generator
100: first port
101: iris diaphragm
102: plunger
110: cylinder
111: damper
112: thin hole
113: elastic member
114: lower chamber
115: upper chamber
120: chamber
121: first elastic member
122: spool
123: second elastic member
124: passage
130: second port
140: third port
150: fourth port
160: drain pipe
170: tank recovery pipe
P1, P2: pressure (hydraulic pressure)
P3: valve pressure

BEST MODE

The invention now will be described more fully hereinafter with reference to the accompanying drawings, in which various embodiments are shown. This invention may, however, be embodied in many different forms, and should not be construed as limited to the embodiments set forth herein. Furthermore, relative terms, such as "front", "back", "up", "down", "upper", "lower", "left", "right", "lateral", etc., may be used herein to simplify the description of the invention and describe one element's relationship to other elements as illustrated in the Figures. It will be understood that relative terms are intended to encompass different orientations of the device in addition to the orientation depicted in the Figures. It will be understood that, although terms, such as "first", "second", "third" and "fourth", may be used herein to describe various elements, these terms are not intended to attach relative importance to the elements.

The present invention has the following characteristics in order to achieve the above-mentioned objects.

Hereinafter, a preferred embodiment of the present invention will be described in detail with reference to the attached drawings. The terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for the sake of understanding the technology of the present invention.

Therefore, the construction of the embodiment illustrated in the specification and the drawings must be regarded as only illustrative examples, which are not intended to limit the present invention. Furthermore, it must be understood that various modifications, additions and substitutions are possible at the point of time of application of the present invention.

In an embodiment of the present invention, a pendulum type wave-power generating apparatus converts pendulum motion of wave-power energy into rotary motion using a hydraulic transmission that has pressure accumulators 31 and 41 on a hydraulic circuit thereof, thus operating a generator 60. A controller for the wave-power generating apparatus includes pressure control valves 33 and 43 which control the output volumes of the hydraulic motors 32 and 42 that operate the generator 60 such that they are proportional to mean hydraulic pressures in pipes 30 and 40 of the hydraulic circuit so that the mean value of wave-power energy input into the hydraulic circuit is equal to the mean value of the drive force of the generator 60, thus making it possible to use wave-power energy regardless of variations in the state of the waves on the sea.

Furthermore, the pressure control valves 33 and 43 use the force of the wave-power energy as input signals and transmit pressures corresponding to the input signals to the generator 60 as output signals, wherein the mean hydraulic pressures of the hydraulic circuit are used as the input signals.

The hydraulic transmission includes: a pump 20, which is connected to a pendulum 11 that swings in a pendulum motion resulting from variations of the wave; the hydraulic motors 32 and 42, which are respectively connected to the pipes 30 and 40 coupled to the opposite ends of the pump 20; and the generator 60, which is operated by the hydraulic motors 32 and 42.

The pressure accumulators 31 and 41 respectively accumulate and store pressures P1 and P2 in the pipes 30 and 40 of the hydraulic circuit.

The pressure control valves 33 and 43 are configured such that if the mean hydraulic pressures of the pipes 30 and 40 connected to the hydraulic motors 32 and 42 of the hydraulic transmission differ from each other and the difference between the mean hydraulic pressures exceeds a preset limiting value, a switching valve 50 communicates the pipes 30 and 40 connected to the hydraulic motors 32 and 42 with each other so that the mean hydraulic pressures in the pipes 30 and 40 of the hydraulic motors 32 and 42 become the same.

Each of the pressure control valves 33 and 43 includes: a first port 100 which is connected to the corresponding pipe 30, 40 of the hydraulic circuit and into which the hydraulic pressure P1, P2 is input; a cylinder 110 into which the hydraulic pressure P1, P2 is applied from the first port 100; a damper 111 which is installed in the cylinder 110 and is moved upwards or downwards by the hydraulic pressure P1, P2 applied thereto from the first port 100; a third elastic member 113 which is contracted by the hydraulic pressure P1, P2 applied to the damper 111 from the first port 100; a chamber 120 in which a spool 122 is moved upwards or downwards by the damper 111, thus increasing or reducing a valve pressure P3 in the chamber 120; first and second elastic members 121 and 123 which are respectively installed on and under the spool 122 and are expanded or contracted depending on the movement of the spool 122; a second port 130 through which the hydraulic pressure P1, P2 of the hydraulic circuit is applied into the chamber 120; a third port 140 which relieves the valve pressure P3 from the chamber 120 to the outside; and a fourth port 150 which communicates with the second port 130 or the third port 140 depending on the upward or downward movement of the spool 122 and transmits the valve pressure P3 to the corresponding hydraulic motor 32, 42 as a control signal 34, 44.

Each pressure control valve 33, 43 transmits the valve pressure P3 in the chamber 120, which is increased or reduced by the hydraulic pressure P1, P2 transmitted through the first port 100 or the second port 130, to a servo 35, 45 of the hydraulic motor 32, 42 through the fourth port 150 as a control signal. If the valve pressure P3 is increased, the control signal is transmitted such that the output volume is reduced. If the valve pressure P3 is reduced, the control signal is transmitted such that the output volume is increased.

The case where the output volume of the hydraulic motor 32, 42 is increased refers to the case where as the wave-power energy increases, the pressure in the pipe 30, 40 increases so that the damper 120 and spool 122 are moved upwards by the hydraulic pressure P1, P2 from the fist port, thus increasing the valve pressure P3.

Hereinafter, the controller of the pendulum type wave-power generating apparatus according to a preferred embodiment of the present invention will be described in detail with reference to FIGS. 1 through 3.

The controller of the pendulum type wave-power generating apparatus according to the present invention converts the pendulum motion into constant high-speed rotation using the hydraulic transmission, thus operating the generator 60. The pressure accumulators (spring pressure accumulators) 31 and 41 are provided on the hydraulic circuit. The controller smoothens the output of power generation using the characteristics of the pressure accumulators and, simultaneously, calculates an incident wave from the mean value of the circuit pressure (the mean hydraulic pressure in the hydraulic circuit pipe) and controls the output volume of the hydraulic motors 32 and 42 such that they correspond to the incident power.

Eventually, regardless of wave conditions of the sea, the impedance matching state can be maintained. The control signals that are produced by determination, using the circuit pressures (the pressures P1 and P2 in the pipes 30 and 40 of the hydraulic circuit), of the pressure control valves 33 and 43 that are of the controller of the pendulum type wave-power generating apparatus after the pressure control valves 33 and 43 have given preset operations to the hydraulic motors 32 and 42. All the signals that are used are analog.

The pendulum type wave-power generating apparatus using the controller of the present invention is focused on the wave nature of the sea and accelerates the pendulum 11 using periodic wave-power, thus generating the pendulum motion that resonates with the wave. The hydraulic transmission converts the pendulum motion into rotary motion, thus operating the generator 60. The apparatus is characterized in that if two conditions of the resonance and impedance matching are satisfied, the power generation efficiency is maximized (in the same manner as that of an antenna). In other words, the same method as optimizing the antenna can be used in the wave-power generation. If the wave of the sea is constant like an electric wave, the method of the antenna can be directly used in the wave-power generation and the optimization of the system is possible. However, because the waves of the sea cannot be constant, the present invention uses the following means.

Statistical data about the sea waves that has been collected by a separate process are organized, and characteristics of power, wave heights and periods are arranged in a database. Here, the characteristics are the mean of data obtained after have been continuously measured for a predetermined time period (e.g., 20 minutes) rather than being obtained in a single measurement. Thus, if such data is prepared, the mean wave height or the mean period can be obtained, so that the mean power corresponding to them can be determined. The present invention indirectly measures the mean wave height without using a separate wave height meter, determines the mean power using the wave height, and controls the hydraulic motors 32 and 42 depending on the mean wave height so that the output volumes of the hydraulic motors 32 and 42 are optimized. Thereby, the efficiency of wave-power generation can be markedly enhanced.

In the case of the waves of the sea, even each wave is irregular, that is, the wave height and the period thereof vary. Given this, the present invention uses a transmission circuit that is configured such that the resonance and impedance matching of each wave can be approximated. To achieve the above purpose, with regard to individual waves, every time waves of different energies are input, hydraulic energy corresponding to the energy of each wave is accumulated in the pressure accumulators 31 and 41. The hydraulic pressures accumulated in the pressure accumulators 31 and 41 are respectively supplied to the hydraulic motors 32 and 42. If the energy of the sea waves increases, the discharge rate of the pump 20 (the flow rate supplied to the hydraulic motors 32 and 42) is increased, so that the mean pressure of the hydraulic circuit that is provided with the hydraulic motors 32 and 42 (that is, the pressures P1 and P2 in the pipes 30 and 40 of the hydraulic circuit) is increased. If the output volumes of the hydraulic motors 32 and 42 are extended so that the outputs of the hydraulic motors 32 and 42 are increased, the consumption flow rate increases, thus reducing the mean pressure of the hydraulic circuit (of the pipes 30 and 40 of the hydraulic circuit). The mean pressure of each of the pipes 30 and 40 of the hydraulic motors also is a parameter that indicates the status of supply and demand of energy used in the generation. In the present invention, this parameter is used as a control signal.

In the present invention, assuming the operation of a typical three-phase induction generator, a simple hydraulic transmission providing constant speed operation is used.

Therefore, the output (Lm) of the hydraulic motor at a constant speed is proportional to the torque of the motor. The torque (TM) of the motor is proportional to a multiple of the pressure (P) by the output volume (Dm) of the motor, so that the output (Lm) of the hydraulic motor at a constant speed is proportional to P×Dm. The present invention realizes the desired control using this relationship.

Conditions of the Wave-Power Generating Apparatus According to the Present Invention In order to realize the production of the present invention on a commercial scale, enhancing the reliability of the product must be focused on. For this, in terms of an increase in the reliability for the price, it is preferable that among standardized products of high quality, appropriate parts be selected and used as parts of the apparatus. The hydraulic motors 32 and 42 used in the present invention refer to standardized products that comply with the above policy. Each hydraulic motor 32, 42 has a characteristic that adds or subtracts the output volume (Dm) of the motor using a pressure signal (analog). Hence, the control method of the present invention is to control the output volume (Dm) of each hydraulic motor 32, 42 using the pressure signal (analog) of the pressure control valve 33, 43. The desired control can be easily implemented by the hydraulic analog method, but also the control signal 34, 44 is transmitted through the thin pipe (connected to the fourth port 150 of the pressure control valve), so that there is no problem even though it is exposed to the sea water. Based upon the premise that the above-mentioned hydraulic motor has high reliability and a simple structure, the present invention will be commercially available as a standardized product.

As characteristics of the sea waves, variation of the wave height and variation of the wave period are related to each other. If the observational station is fixed, the larger the wave height, the longer the wave period. In the wave-power generating apparatus, the energy of the incident wave is designated by a mathematical function in two kinds of variables of the wave height and the wave period. Therefore, the method of measuring the two kinds of variables and conducting the generation control using these values must be precise. The controller of the present invention intentionally uses only the value of the wave height in consideration of the performance against the costs. The reasons for this is as follows.

As stated above, the power (from 10 to 20 times the design rating power) of the sea waves, for example, in a storm, may destroy the apparatus. Thus, a positive incident power-cut is needed to enhance the safety. If the power of the sea waves exceeds the design rating power, it is required to reduce the input power rather than to increase the power generation efficiency. As such, requiring the control effect of the present invention is limited to normal conditions in which the power of the sea waves is within the design rating power. Hence, a normal 'control error' attributable to not using data about the period of the waves can be disregarded in practical use.

If data about the period of the waves is not used, although some of the characteristics may be sacrificed, there is an advantage sufficient to overcome the sacrifice in that the apparatus can be simplified.

The power (force of the wave-power energy)(per unit width) of the sea waves: W (kW/m) is expressed by the following Equation (1).

$$W \approx 0.5 H_{1/3}^2 T_{1/3} \quad \text{Equation (1)}$$

(where $H_{1/3}$: significant wave height (m), $T_{1/3}$: significant wave period (s))

The controller of the pendulum type wave-power generating apparatus according to the present invention conforms the case where $T_{1/3}$: significant wave period=a constant in Equation (1). Therefore, W is regarded as being proportional to $H_{1/3}^2$. The sea waves having such characteristics act as the input, thus operating the pendulum 11. Then, the pendulum 11 swings and absorbs wave-power energy. The absorbed power: E (kW) is expressed as the following Equation (2).

$$E = 2 \times 10^{-3} \overline{T_p} \theta_0 / T_{1/3} \quad \text{Equation (2)}$$

(where $\overline{T_p}$: the mean value (Nm) of load torque applied to the pendulum shaft, $\theta_0$: a swing angle (radian) of the pendulum)

If the load applied to the pendulum is controlled so that Equation (1)=Equation (2), in other words, if $$W = E \quad \text{Equation (3)}$$

is satisfied, the efficiency of wave-power generation can be maximized (impedance match). Because the pendulum 11 operates the pump 20 of the hydraulic transmission, the mean value $\overline{T_p}$ of load torque applied to the pendulum shaft is proportional to the mean value of the output pressure of the pump 20. In this case, a proportional constant is appropriately selected such that the swing angle $\theta_0$ of the pendulum is proportional to the wave height $H_{1/3}$ and Equation 3 is satisfied (the value of the proportional constant is determined by characteristics of the pressure accumulators 31 and 41). The swing angle, the load torque and the hydraulic pressure of the pump 20 are proportional to the wave height, and the input of the pump 20 is proportional to the square of the wave height. As shown in Equation (1), in response to a variation in the wave height of the incident wave, the incident power varies in proportion to the square of the wave height, but because the swing angle of the pendulum 11 and absorption power are proportional to the square of the swing angle, the swing angle is proportional to the wave height. Further, if the proportional constant is appropriately determined, the incident power becomes equal to the absorption power. In other words, impedance matching is satisfied.

If the discharge rate of the pump 20 and the mean values of the consumption rates of the hydraulic motors 32 and 42 are balanced, the mean values of the pressures P1 and P2 in the hydraulic circuit pipes 30 and 40 become constant. An excess or deficiency amount is regulated by absorption or discharge of the pressure accumulators 31 and 41 and expressed as a variation in pressure. In this case, Equation 3 must also be satisfied to realize the high efficiency operation. Here, if the consumption rates are increased or reduced by adjusting the output volumes of the hydraulic motors 32 and 42 in response to the variation of the mean values of the pressures P1 and P2 of the pipes 30 and 40 so that the state of Equation (3) is satisfied, the high efficiency operation can be automatically maintained. That is, if the wave height is varied by variations in the conditions of the sea, the mean values of the pressures P1 and P2 of the pipes lose the balance and will vary. At this time, the pressure control valves 33 and 43 of the present invention increases or reduces the output volume (the size of output volume) of the hydraulic motors 32 and 42 in response to the pressures P1 and P2 of the pipes of the hydraulic circuit, thus reviving the impedance matching conditions, thereby stabilizing the mean value of each pipe pressure P1, P2 at another predetermined value.

FIG. 1 is a system circuit view showing the structure of the pendulum type wave-power generating apparatus provided with the controller according to the embodiment of the present invention to improve the power generation efficiency. This will be explained in detail below.

The apparatus converts wave-power energy into the swing energy of the pendulum 11 and converts it into continuous rotary motion using the hydraulic transmission, thus operating the generator 60, wherein because of the two factors of: ①the wave-power energy being efficiently used for the operation of the generator 60; and ② preventing period variation from occurring in the generation output are satisfied, the apparatus can be of practical use. The structure and operation of the power generation system having the controller of the pendulum type wave-power generating apparatus according to the present invention will be described with reference to FIG. 1.

Referring to FIG. 1, waves enter the apparatus from the right side of a channel 10 and apply wave-power to a flat board of the pendulum 11 which pivots around a support point 12 at the left side of the channel 10, thus swinging the pendulum 11. This pendulum motion is transmitted to the pump (hydraulic pump 20). The pump 20 sucks oil from a bed tank 21 and alternately sends pressing oil to the pipe (30, referred to as 'the first pipe' for the sake of explanation, Pressure P1) or the pipe (40, referred to as 'the second pipe' for the sake of explanation, Pressure P2) depending on the direction in which the pendulum 11 moves. The pressure accumulator 31 is provided on the first pipe 30. The hydraulic motor 32 is connected to the first pipe 30. The pressure accumulator 41 is provided on the second pipe 40. The hydraulic motor 42 is connected to the second pipe 40. The hydraulic motors 32 and 42 operate as a pair on the generator 60. Because there is a phase difference of 180° between the hydraulic motors 32 and 42, periodic torque variations of the hydraulic motors 32 and 42 are offset by overlap between the two motors. Thereby, the output of power generation can become smooth. One stroke of the oil discharge of the pump 20, for example, includes discharging oil for a ½ T second to the hydraulic motor 32, and resting for a subsequent ½ T second (the discharge rate per one stroke corresponds to the amount required to continuously rotate the hydraulic motor 32 for the one period of a T second). Because the flow rate of the hydraulic motor 32 is constant and the instantaneous discharge rate of the hydraulic pump 20 varies, a difference in the flow rate therebetween is accumulated in the pressure accumulator 31. Of course, the case of the hydraulic motor 42 is the same as that of the hydraulic motor 32.

The pressure accumulator 31 connected to the first pipe 30 and the pressure accumulator 41 connected to the second pipe 40 are of the spring type, wherein each increases the pressure in proportion to the volume of oil accumulated therein, and accumulated energy is proportional to the square of the volume of oil accumulated therein. Thus, the pressure of the first pipe 30 varies depending on the size of the volume of oil accumulated in the pressure accumulator 31. The pressure of the second pipe 40 varies depending on the size of the volume of oil accumulated in the pressure accumulator 41.

If the incident wave height is increased by variation in the conditions of the sea, the swing angle of the pendulum 11 and the discharge rate of the hydraulic pump 20 are increased. Because the required flow rates of the hydraulic motors 32 and 42 are constant, extra oil accumulates in the pressure accumulators 31 and 41, so that the mean value of the pressure p1 in the first pipe 30 and the mean value of the pressure P2 in the second pipe 40 are increased. The pressure control valve 33 receives the pressure P1 as a control signal and controls the output volume Dm of the hydraulic motor 32 using its output signal, thus increasing the required flow rate of the hydraulic motor 32. As a result, the discharge rate of the hydraulic pump 20 is balanced with the required flow rate of the hydraulic motor 32, so that the mean value of the pressure P1 of the first pipe 30 is stabilized at a new value.

In the same manner, the pressure control valve 43 receives the pressure P2 in the second pipe 40 as a control signal and controls the output volume Dm of the hydraulic motor 42, thus increasing the required flow rate of the hydraulic motor 42. As a result, the discharge rate of the hydraulic pump 20 is balanced with the required flow rate of the hydraulic motor 42, so that the mean value of the pressure P2 of the second pipe 40 is stabilized into another new value.

Energy Ew (kNm) of an incident wave applied to the pendulum 11 of a width B for a period of a T second is expressed by the following Equation (4).

$$E_W \approx 0.5 \times H^2 \times T^2 \times B \text{ (kNm)} \qquad \text{Equation (4)}$$

(where H: a significant wave height (m), T: a significant wave period (s), B: width (m) of the pendulum)

If it is assumed that oil (volume V) discharged from the pump 20 has accumulated in the pressure accumulators 31, 41 once, energy $E_0$ of the discharge oil is expressed as the following Equation (5).

$$E_0 = (Ap)^2/(2k) = kV^2/2A^2 \text{ (Nm)} \qquad \text{Equation (5)}$$

(where A: an area (m²) of a piston of the pressure accumulator, P: hydraulic pressure (Pa), k: spring constant (N/m))

The hydraulic pressure P is proportional to a displacement x of the piston in the pressure accumulator 31, 41 (therefore, it is proportional to the volume V of oil accumulated in the pressure accumulators 31, 41).

In the above-mentioned system structure, when the spring constant of the spring of the pressure accumulator is adjusted such that the mean value of the pressure P1 or the mean value of the pressure P2 when in the normal conditions is proportional to the incident wave height, and when Equation (3) is satisfied, the conditions becomes as follows.

(1) The size of the swing angle of the pendulum is proportional to the incident wave height.

(2) The power of the incident wave is proportional to the square of the incident wave height.

(3) The power absorbed by the pendulum is proportional to the square of the pressure of the pressure accumulator.

(4) The efficiency of the wave-power generation becomes maximized.

In other words, as is well known, when the mean value of the pressure P1 or the mean value of the pressure P2 is proportional to the wave height, the swing angle of the pendulum is also proportional to the wave height. $E_W$ of Equation (4) is proportional to the square of the wave height H, $E_0$ of Equation (5) is proportional to the square of the volume V, and the volume V is proportional to the weight height H. Therefore, if an appropriate parameter is selected, in the state in which the parameter is fixed, the conditions of the impedance match, such as Equation (6) that is derived from Equations (4) and (5), are satisfied within a wide range of wave heights H.

$$E_W = E_0 \qquad \text{Equation (6)}$$

In this state, to promote the stable power generation, the output volume Dm of each hydraulic motor 32, 42 is increased or reduced depending on the variation in the discharge rate of the pump 20. The purpose of the pressure control valves 33 and 43 is to achieve the above purpose. The pressure control valve 33 increases or reduces the output volume of the hydraulic motor 32 using the servo 35, and the other pressure control valve 43 increases or reduces the output volume of the hydraulic motor 42 using the servo 45.

The pressure P1 in the first pipe is determined by the volume of oil accumulated in the pressure accumulator 31, and the pressure P2 in the second pipe is determined in the same manner as that of the pressure P1. However, after the apparatus has been operated for a long period of time, the pressures in the first and second pipes may vary. The reason for this is because although there is slight oil leakage, errors accumulate over a long period of time. If this compounding is neglected, power distribution between the two hydraulic motors 32 and 42 becomes unbalanced. To prevent this problem, the switching valve 50 compares the control signal 34 of the pressure control valve 33 and the control signal 44 of the pressure control valve 43, and if the difference between the two exceeds a predetermined limit, the switching valve 50 connects the first pipe to the second pipe, thus equalizing the pressures in the two pipes. After the pressures in the two pipes have been equalized, the connection between the two pipes is interrupted. Thereby, the balanced load distribution to the two hydraulic motors 32 and 42 can be automatically maintained.

Figure 2:
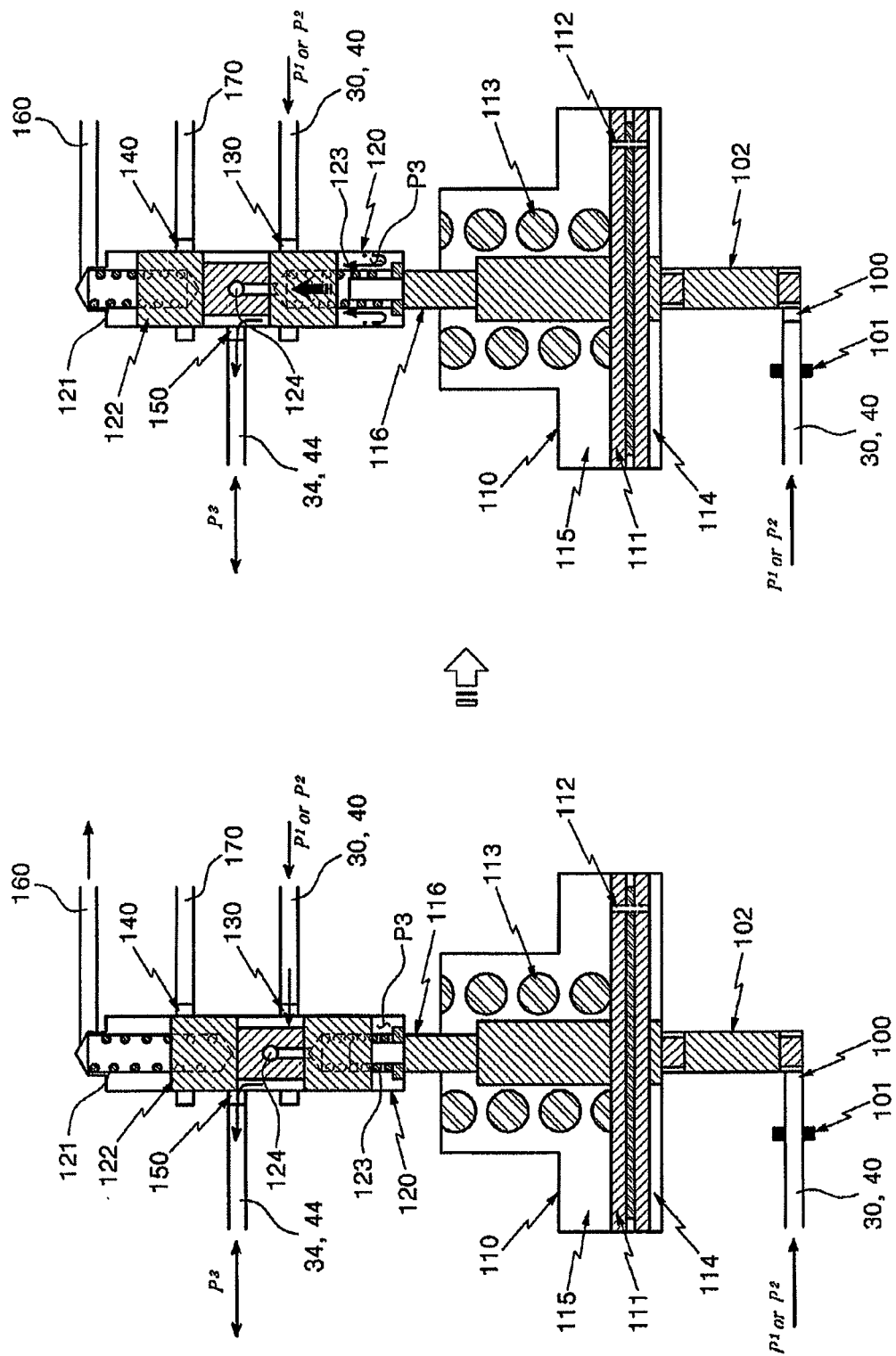
FIG. 2 is of front sectional views of an embodiment of a pressure control valve showing an initial stage of operation of a pendulum in which internal valve pressure is increasing.
Figure 3:
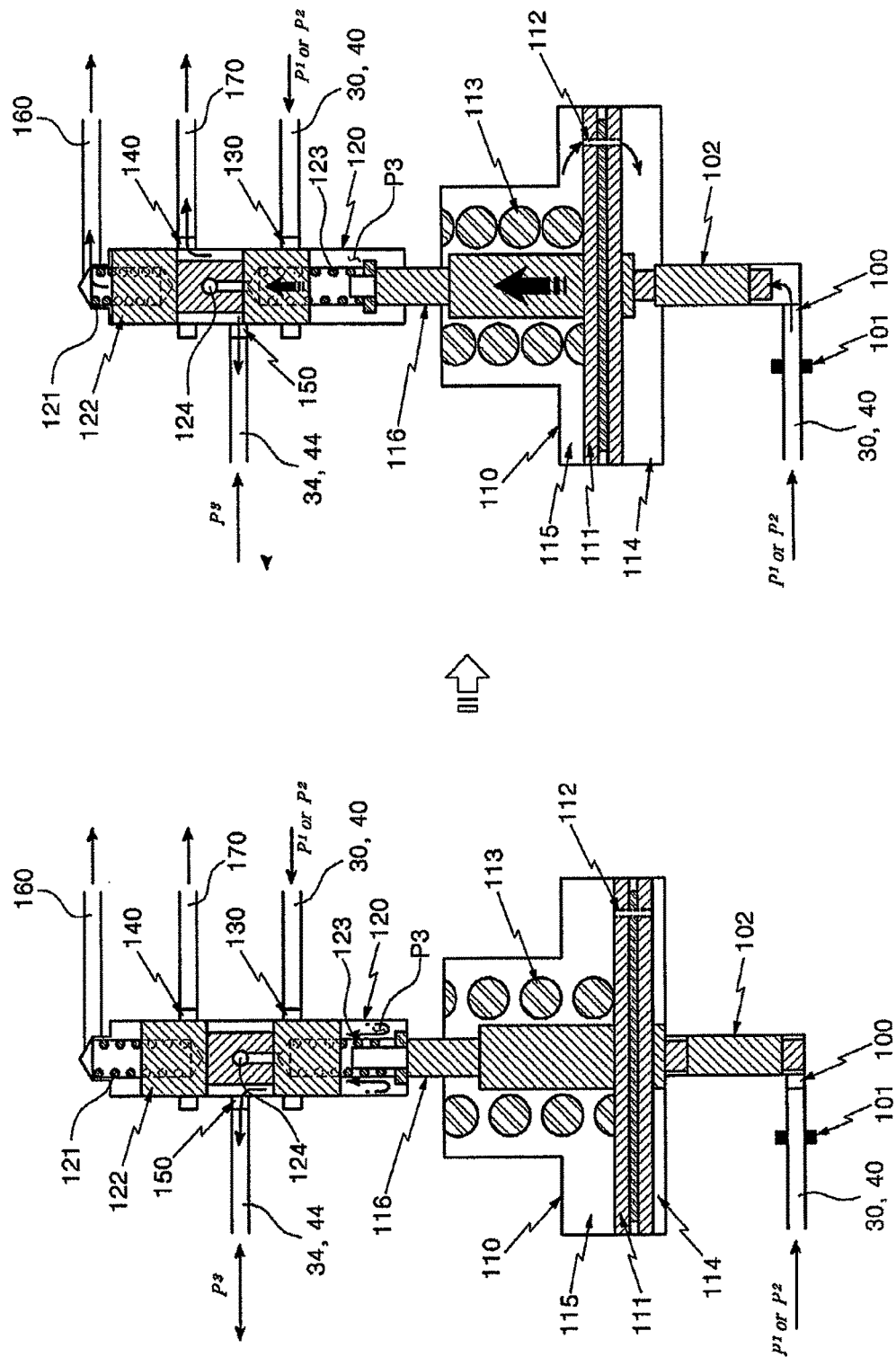
FIG. 3 is of front sectional views showing an embodiment of the pressure control valve which transmits a control signal of an increase of the output volume of a hydraulic pump as the valve pressure (P3) is reduced, according to the present invention.

FIGS. 2 and 3 are front sectional views showing the pressure control valve according to the present invention. In detail, although FIG. 2 illustrates one of the pressure control valves that is provided on the first pipe 30, the principle and structure thereof are the same as those of the pressure control valve provided on the second pipe 40. The pressure control valve includes a part which extracts the mean value of the pressure (hydraulic pressure, P1) (which is periodically varying) in the first pipe using a displacement of plunger 102, and a spool type pressure control valve which converts the displacement into hydraulic pressure.

Of the pressure control valves, FIG. 2 will be explained with reference to the pressure control valve 33 provided on the first pipe 30. As shown in FIG. 2, the plunger 102 is placed upright in the lower end of the pressure control valve 33, and the hydraulic pressure P1 of the first pipe 30 that has passed through an iris diaphragm 101 pushes the plunger 102 upwards with a force proportional to the pressure P1. This force is transmitted to the third elastic member 113 via the damper 111 and makes an upward displacement proportional to the pressure (hydraulic pressure, p1). This is the pressure accumulator provided with a small damper. This displacement is transmitted to the second elastic member 123 which biases the spool 122 upwards, thus increasing or reducing the force of the second elastic member 123. The spool 122 may communicate the fourth port 150 of the pressure control valve 33 with the second port 130 or communicate the fourth port 150 with the third port 140. This operation is governed by the combination of three kinds of axial forces including the first and second elastic members 121 and 123 that are applied to the spool 122 and the valve pressure P3 in the chamber 120.

At the initial stage of the operation of the pendulum 11, as shown in FIG. 2, because the first elastic member 121, which generates a constant and strong axial force, biases the spool 122 downwards, the second port 130 communicates with the fourth port 150, so that the pressure P1 is high when applied to the second port 130 through the first pipe 30 and applied towards P3 of the chamber 120. Thereby, the valve pressure P3 in the chamber 120 is increased, thus pushing the spool 122 upwards in the chamber 120. Thus, the second port 130 that has been connected to the first pipe 30 is closed, so that the increase in the valve pressure P3 in the chamber 120 stops. At this time, the magnitude of the valve pressure P3 is proportional to the intensity of the resultant force applied to the spool 122 downwards.

On the other hand, the valve pressure P3 may decrease. As shown in FIG. 3, in an embodiment, when the pressure in the first pipe 30 increases and the pressure p1 is applied into the first port 100, thus moving the plunger 102 upwards, the damper 111 is moved upwards. Then, the third elastic member 113 is compressed and a damper guide 116 is moved upwards, so that the second elastic member 123 is compressed and the force of the second elastic member 123 offsets the force of the first elastic member 121 that biases the spool 122 downwards, thus reducing the valve pressure P3 in the chamber. At this time, the valve pressure P3 is used as the control signal 34 of the output volume of the hydraulic motor 32 and is transmitted through the fourth port 150. In this case, as the wave-power energy increases, the discharge rate of the hydraulic pump 20 is also increased. Thus, the reduced valve pressure P3 in the pressure control valve 33 is transmitted as the control signal through the fourth port 150 connected to the servo 35 of the hydraulic motor 32. Thereby, the output volume of the hydraulic motor 32 is increased. Of course, in the case where the valve pressure increases, the reduced valve pressure P3 in the pressure control valve 33 is transmitted as the control signal 34, so that the output volume of the hydraulic motor 32 is increased (of course, as shown in FIG. 1, the first pipe 30 that transmits the pressure P1 to the pressure control valve 33 and the second pipe 40 that transmits the pressure P2 to the other pressure control valve 43 are connected to the switching valve 50, so that when signals are transmitted from the pressure control valves 33 and 43, the pressures (hydraulic pressures P1 and P2) in the first and second pipes 30 and 40 are applied to the switching valve 50, and a member in the switching valve 50 is thus moved in one direction, thus connecting the first and second pipes 30 and 40 to each other, thereby balancing the pressures P1 and P2 in the first and second pipes 30 and 40 that have become unbalanced).

In other words, this embodiment illustrates the case where when the valve pressure P3 is high, the output volume Dm is small, and as the valve pressure P3 is reduced, the output volume Dm is increased (of course, as stated above, the principle of the above-mentioned operation is also applied in the same manner to the pressure control valve 43 provided on the second pipe 40).

Although the hydraulic pressure (pressure P3) of the first pipe 30 periodically varies at wave period T, the present invention is configured such that the variable constituent is prevented from being transmitted to the valve pressure P3. To achieve the above purpose, the present invention is provided with the damper 111. The damper guide 116 is provided on the upper end of the damper 111. The damper 111 uses the inner surface of the cylinder 110 as a guide surface and is guided by the damper guide 116, so that the damper 111 can be smoothly moved upwards or downwards by the movement of the plunger 102.

The interior of the cylinder 110 is partitioned into a lower chamber 114 and an upper chamber 115 by the damper 111. A strong damping operation is conducted by oil flowing along a thin hole 112 which is formed between the two chambers. Thereby, the periodic variable constituent of the sea wave is eliminated, and the valve pressure P3 corresponding to the mean values of the conditions of the sea waves per unit time (for example, the mean values when waves are input five to ten times) can be simply obtained.

The Embodiment of the Present Invention and Specifications of this Case

In the case of the incident wave height H=2 m, the incident wave period T=6 s, the coast of the water depth h=3 m and the pendulum width B=4 m, the power Pw of a wave applied to the pendulum $11 \approx 96$ kW. This value is a short-time means value and takes into account the characteristics of the sea waves. It is greater than a long-time mean value obtained from Equation (4). The amplitude $\theta_0$ of the pendulum $11 \approx 40°$ to $60°$. The power of the generator 60 is 40 kW (three-phase induction AC generator, six pole, 1200 rpm (maximum)), as it is expected that the efficiency $\eta$ of the generator 60=power generating output/incident wave input$\approx$42%. A6VM55 (Dm=54.8 cm$^3$/rev, maximum) of Rexroth company of Germany is used as each hydraulic motor 32, 42. The capacity of each pressure accumulator 31, 41 is 10 liters, and the maximum pressure thereof is 20 Mpa. In each pressure control valve 33, 43, the diameter of the spool 122 ranges from 10 mm to 20 mm. This is not large as a control element.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A pendulum type wave-power generating apparatus converting a pendulum motion of wave-power energy into a rotary motion using a hydraulic transmission that has pressure accumulators (31) and (41) on a hydraulic circuit thereof, thus operating a generator (60), a controller comprising:
pressure control valves (33) and (43) controlling output volumes of hydraulic motors (32) and (42) that operate the generator (60) such that the output volumes are corresponding to hydraulic pressures in pipes (30) and (40) of the hydraulic circuit so that a mean value of wave power energy input into the hydraulic circuit is equal to a mean value of a drive force of the generator (60), whereby wave-power energy is able to be used regardless of a variation in wave conditions on the sea,
wherein each of the pressure control valves (33) and (43) comprises:
a first port (100) connected to the corresponding pipe (30), (40) of the hydraulic circuit so that hydraulic pressure (PI), (P2) is input into the first port (100);
a cylinder (110) into which the hydraulic pressure (PI), (P2) is applied from the first port (100);
a damper (111) installed in the cylinder (110), the damper (111) being moved upwards or downwards by the hydraulic pressure (PI), (P2) applied thereto from the first port (100);
a third elastic member (113) contracted by the hydraulic pressure (PI), (P2) applied to the damper (111) from the first port (100);
a chamber (120) in which a spool (122) is moved upwards or downwards by the damper (111), thus increasing or reducing a valve pressure (P3) in the chamber (120);
first and second elastic members (121) and (123) respectively installed on and under the spool (122), the first and second elastic members (121) and (123) being expanded or contracted depending on movement of the spool (122);
a second port (130) through which the hydraulic pressure (PI), (P2) of the hydraulic circuit is applied into the chamber (120);
a third port (140) which relieves the valve pressure (P3) from the chamber (120) to an outside; and
a fourth port (150) communicating with the second port (130) or the third port (140) depending on the upward or downward movement of the spool (122), the fourth port (150) transmitting the valve pressure (P3) to the corresponding hydraulic motor (32), (42) as a control signal (34), (44).

2. The pendulum type wave-power generating apparatus according to claim 1, wherein the hydraulic transmission comprises:
a pump (20) connected to a pendulum (11) that is swung in a pendulum motion by variation of a wave; and
the hydraulic motors (32) and (42) respectively connected to the pipes (30) and (40) coupled to opposite ends of the pump (20).

3. The pendulum type wave-power generating apparatus according to claim 1, wherein the pressure accumulators (31) and (41) respectively accumulate and store pressures (P1) and (P2) in the pipes (30) and (40) of the hydraulic circuit.

4. The pendulum type wave-power generating apparatus according to claim 1, wherein the pressure control valves (33) and (43) are configured such that when the mean hydraulic pressures of the pipes (30) and (40) connected to the hydraulic motors (32) and (42) of the hydraulic transmission differ from each other and a difference between the mean hydraulic pressures exceeds a preset limiting value, a switching valve (50) communicates the pipes (30) and (40) connected to the hydraulic motors (32) and (42) with each other so that the mean hydraulic pressures in the pipes (30) and (40) of the hydraulic motors (32) and (42) are equal to each other.

* * * * *